United States Patent [19]
Singh et al.

[11] Patent Number: 5,903,908
[45] Date of Patent: *May 11, 1999

[54] METHOD AND APPARATUS FOR MAINTAINING CACHE COHERENCY USING A SINGLE CONTROLLER FOR MULTIPLE CACHE MEMORIES

[75] Inventors: Gurbir Singh, Portland; Konrad K. Lai, Aloha; Michael W. Rodehamel, Beaverton, all of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/731,546

[22] Filed: Oct. 15, 1996

Related U.S. Application Data

[63] Continuation of application No. 08/204,647, Mar. 1, 1994, abandoned, which is a continuation-in-part of application No. 08/176,782, Jan. 4, 1994, abandoned.

[51] Int. Cl.⁶ .............................. G06F 13/14; G06F 9/30
[52] U.S. Cl. ........................ 711/122; 711/117; 711/118; 711/133; 711/141; 711/144; 711/145; 711/146; 711/215; 365/49; 364/DIG. 1; 257/676; 361/760

[58] Field of Search ..................... 364/DIG. 1; 365/49; 395/444, 445, 446, 449, 460, 468, 471; 711/117, 118, 122, 133, 141, 144; 257/676; 361/760

[56] References Cited

U.S. PATENT DOCUMENTS

| | | | |
|---|---|---|---|
| 3,766,532 | 10/1973 | Liebel, Jr. ................................ | 395/597 |
| 4,141,067 | 2/1979 | McLagan ................................ | 395/468 |
| 4,323,967 | 4/1982 | Peters et al. ............................ | 395/287 |
| 4,342,069 | 7/1982 | Link ........................................ | 361/401 |
| 4,755,930 | 7/1988 | Wilson, Jr. et al. ..................... | 711/122 |
| 4,969,122 | 11/1990 | Jensen ..................................... | 365/49 |
| 5,025,366 | 6/1991 | Baror ...................................... | 711/128 |
| 5,058,006 | 10/1991 | Durden et al. .......................... | 395/449 |
| 5,136,700 | 8/1992 | Thacker .................................. | 711/122 |
| 5,155,067 | 10/1992 | Wood et al. ............................. | 437/209 |
| 5,193,163 | 3/1993 | Sanders et al. ......................... | 395/449 |
| 5,249,282 | 9/1993 | Segers ..................................... | 395/449 |
| 5,251,308 | 10/1993 | Frank et al. ............................. | 711/163 |
| 5,265,235 | 11/1993 | Sindhu et al. ........................... | 711/120 |

(List continued on next page.)

OTHER PUBLICATIONS

Popescu, Val; Schultz, Merle; Spracklen, John; Gibson, Gary; Lightner, Bruce; Isaman, David, "The Metaflow Architecture", IEEE Micro, Jun. 1991, pp. Nos. 10–13 and 63–73.

Baer et al, "On The Inclusion Properties for Multi–Level Cache Hierarchies", 1988, pp. 73–80.

Uchiyama et al, "Design of A Second–Level Cache Chip for Shared–Bus Multimircroprocessor Systems", IEEE1991, pp. 566–571.

Popescu, et al. "The Metaflow Architecture", IEEE Micro, Jun. 1991, pp. 10–13 and 63–73.

*Primary Examiner*—Tod R. Swann
*Assistant Examiner*—Denise Tran
*Attorney, Agent, or Firm*—Blakely, Sokoloff, Taylor & Zafman LLP

[57] ABSTRACT

A method and apparatus for controlling multiple cache memories with a single cache controller. The present invention uses a processor to control the operation of its on-chip level one (L1) cache memory and a level two (L2) cache memory. In this manner, the processor is able to send operations to be performed to the L2 cache memory, such as writing state and/or cache line status to the L2 cache memory. A dedicated bus is coupled between dice. This dedicated bus is used to send control and other signals between the processor and the L2 cache memory.

13 Claims, 6 Drawing Sheets

U.S. PATENT DOCUMENTS

| | | | |
|---|---|---|---|
| 5,287,484 | 2/1994 | Nishii et al. | 395/471 |
| 5,297,269 | 3/1994 | Donaldson et al. | 711/145 |
| 5,303,362 | 4/1994 | Butts, Jr. et al. | 711/121 |
| 5,317,716 | 5/1994 | Liu | 711/144 |
| 5,319,766 | 6/1994 | Thaller et al. | 395/473 |
| 5,325,503 | 6/1994 | Stevens et al. | 395/455 |
| 5,325,504 | 6/1994 | Tipley et al. | 395/455 |
| 5,345,576 | 9/1994 | Lee et al. | 395/308 |
| 5,353,424 | 10/1994 | Partovi et al. | 711/128 |
| 5,361,267 | 11/1994 | Godiwala et al. | 371/40.1 |
| 5,369,753 | 11/1994 | Tipley | 395/449 |
| 5,375,216 | 12/1994 | Moyer et al. | 711/123 |
| 5,388,224 | 2/1995 | Maskas | 395/284 |
| 5,388,244 | 2/1995 | Maskas | 711/208 |
| 5,390,311 | 2/1995 | Fu et al. | 711/215 |
| 5,414,828 | 5/1995 | Yarkoni et al. | 711/118 |
| 5,434,993 | 7/1995 | Liencres et al. | 395/460 |
| 5,446,863 | 8/1995 | Stevens et al. | 395/427 |
| 5,454,088 | 9/1995 | Nakagawa et al. | 395/387 |
| 5,454,093 | 9/1995 | Abduhafiz et al. | 395/460 |
| 5,524,233 | 6/1996 | Milburn et al. | 711/141 |

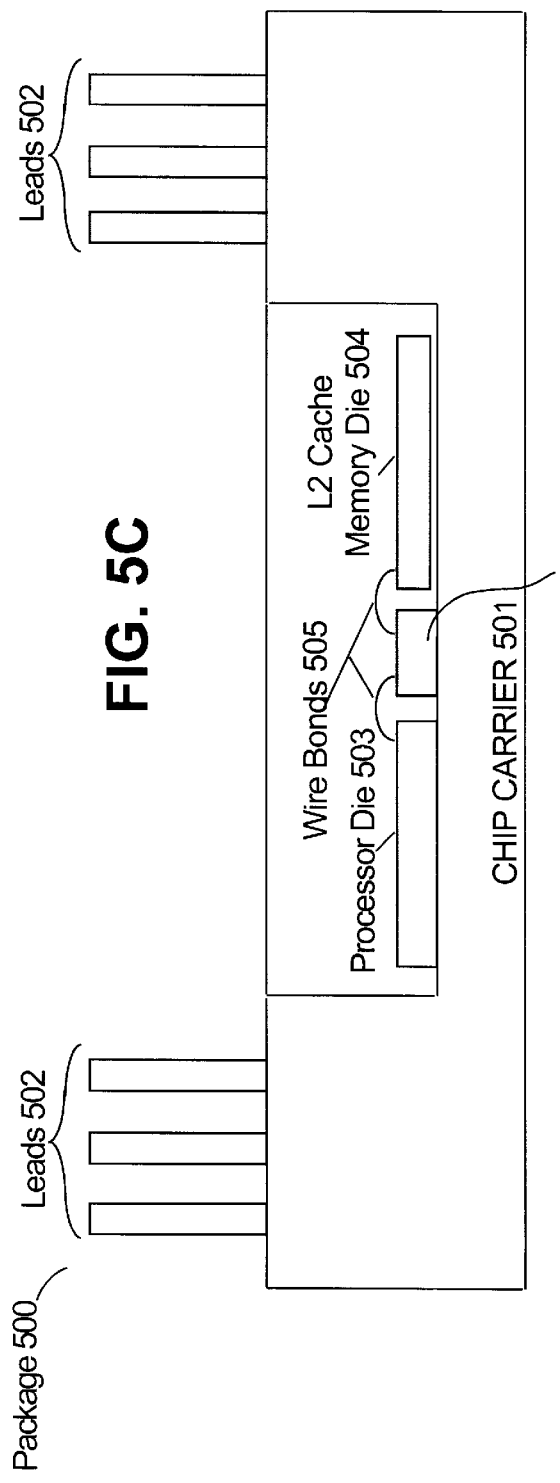
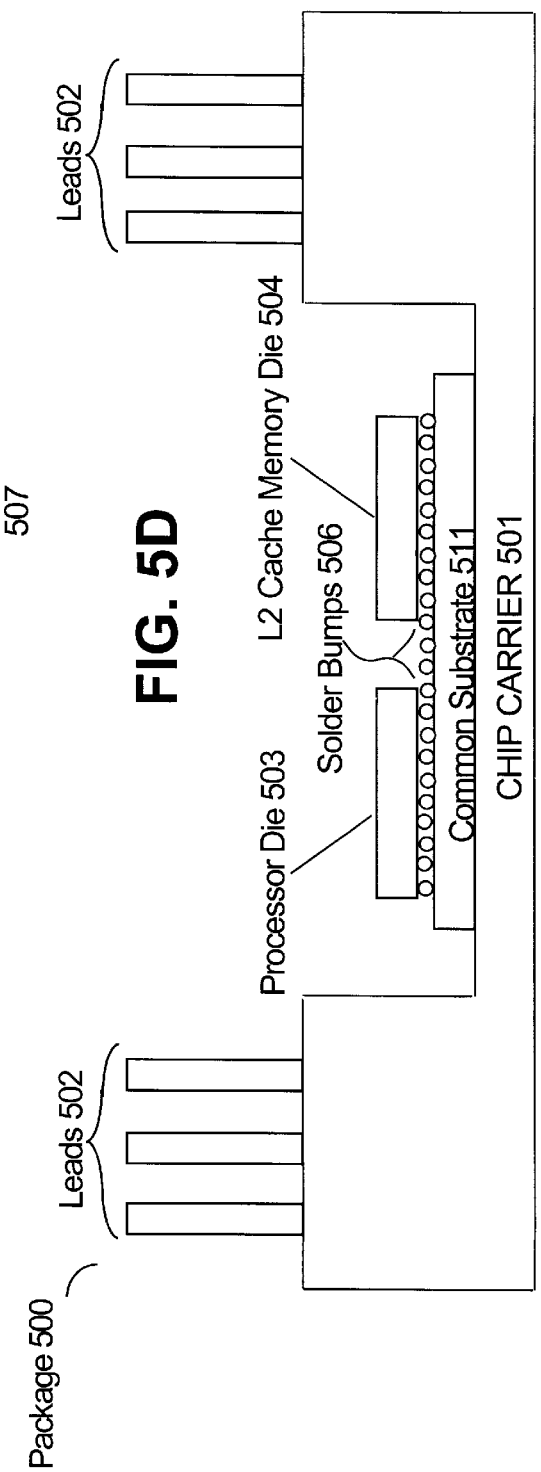

METHOD AND APPARATUS FOR MAINTAINING CACHE COHERENCY USING A SINGLE CONTROLLER FOR MULTIPLE CACHE MEMORIES

This is a continuation of application Ser. No. 08/204,647, filed Mar. 1, 1994, now abandoned, which is a CIP of application Ser. No. 08/176,782 filed Jan. 4, 1994, now abandoned.

FIELD OF THE INVENTION

The present invention relates to the field of computer systems; more particularly, the present invention relates to the field of cache memory arrangements including the control of an off-chip cache from a single integrated circuit.

BACKGROUND OF THE INVENTION

Throughout the development of computer systems, a primary emphasis has been on increasing the speed of such systems and their ability to handle larger and more complicated programs while reducing their cost. In order to increase the ability of a computer system, it is necessary to both increase the size of the random access memory (RAM) so its larger programs may be utilized by the computer system and to increase the speed at which access to that RAM is afforded. The straight forward method of increasing access speed is to use components which operate more quickly. However, such rapidly-operating components are more expensive than slower memory components.

With the cost involved in providing high speed RAM, advanced computer systems have used high-speed cache memory arrangements to increase the operational speed of the memory system. A cache memory arrangement provides a small portion of a specially fast memory and digital to the regular RAM. As commands are issued and data is utilized, the information is called from the RAM and stored in the cache memory. As each new read and write command is issued, the system looks to the fast memory cache to determine if the information is stored in the cache. If the information is available in the cache memory, access to the RAM is not required and the command may be processed or the data accessed much more readily. If the information is not available in the cache memory, the new data can be copied from the main memory and stored in the cache memory where can be accessed and remain for later use by the system. In well-designed memory systems, the information slot lies in the cache memory over 90% of the time, on average. Consequently, use of the cache memory substantially speeds up the overall operation of the memory utilized in the computer system.

In order to further enhance the speed of operation of the computer system, it has been found desirable to provide a small portion of extremely rapid cache memory directly on a processor chip. For example, it may be useful to provide such a small fast cache memory consisting of 8 kilobytes of memory directly on the chip with the other elements of a CPU. Such an arrangement is capable of greatly increasing the speed of the operation of the system for information which is used repeatedly by various processes.

Today, cache memories are commonly designed at two levels: a first level (L1) cache and a second level (L2) cache. An L1 cache is a single layer of high speed memory between a microprocessor and main system dynamic RAM (DRAM) memory. L1 caches hold copies of code and data most frequently requested by the microprocessor and are typically small ranging from 4 kilobytes to 64 kilobytes in size. The L2 cache, on the other hand, is a second layer of high speed memory between the L1 cache and the main system DRAM memory. L2 caches also hold copies of code and data frequently requested by the microprocessor. The L2 cache handles the more random memory request that the L1 cache misses. In order to simplify the handling of requests that the L1 cache misses, the L2 cache typically includes all the data of the L1 cache and more. As a result, a L2 cache is almost always larger than a L1 cache ranging in size typically from 64 kilobytes to 512 kilobytes.

The performance of a cache is affected by the organization of the cache. Typically, there are three types of organizations that are most commonly used. These are fully associative, set associative and direct mapped (one-way set associative). In a fully associative cache memory, each item of information from the main memory system is stored as a unique cache entry. There is no relationship between the location of the information in the data cache RAM memory and its original location in the main system memory. If there are x storage locations in the cache, the cache will remember the last x main system memory locations accessed by the microprocessor. With a fully associative cache, the location of each store can hold information from any location in the main system memory. As a result, the cache requires complex tag entries (to map the complete main memory system memory space), resulting in very complex and expensive cache comparison logic. Set associative cache organizations divide the data cache RAM into banks of memory, or "ways". A 2-way set associative cache divides the data cache RAM into two ways, a 4-way set associative cache into four ways, and so on. The set associative cache separates main system memory into pages, where each page is equal in size to the size of a way. For example, a 64 k-bit 2-way set associative cache would logically see the main memory as a collection of 32 k-bytes pages, equal in size to each way. Each location in a memory page can map only to the same location in a cache way. For example, in a 2-way set associative cache memory, each location in the main system memory page can map to the same location of either of the two cache way locations in the cache. When the microprocessor makes a memory request, the set associative cache compares the memory request with the tag entry at the page location in each of its ways to determine if the information is in the cache (i.e., a hit). This means the cache has to do one comparison for each way, for a total number of comparisons equal to the number of ways. For example, in a 2-way set associative cache memory, the cache would only have to make two parallel comparisons to determine if the information requested is stored in the cache.

A direct mapped (1-way set associative cache organization) uses the entire data cache RAM as one bank of memory or way. The main system memory of the cache is logically separated into pages, where each page is the size of a data cache RAM. Each location in any main system memory page directly maps only into the same location in the data cache RAM.

In prior art, a separate cache controller is used to provide access to the L2 cache. The cache controller is separate from the processor in the computer system, usually as a separate computer chip. The cache controller is very complicated logic. Most processor systems contain two such controllers, one to control the L1 cache within the processor and the other to control the L2 cache in the system. The design of these two controllers is a compromise between performance and complexity of state that must be shared between them. The system of such hierarchical caches would provide the highest overall performance if the two cache controllers had access to information of both the cache memories and the processor and bus accesses. This is clearly not possible when the cache controller for the L2 cache memory lies in a separate package.

Another problem with the prior art is that the L2 cache is on the system bus and access to the L2 cache is limited to the speed of the system bus. For instance, if the system bus is running at 10 MHz, an access to the L2 cache can not be performed faster than 10 MHz. It would be advantageous for the processor to be able to access the L2 cache at a rate faster than that of the system bus in order to increase the overall speed of the system.

Thus, it is desirable to have a processor that may operate with multiple types of cache organizations, including the option of operating without a cache memory (if so desired). Therefore, as the different organizations are upgraded in the future, the microprocessor may not have to undergo any changes itself.

SUMMARY OF THE INVENTION

It is an object of the invention to provide a level two (L2) cache memory for use in a computer system.

It is yet another object of the invention to provide an L2 cache memory that may be accessed at a faster rate than the system bus operates.

It is further an object of the invention to provide a cache memory that may support use with multiple types of processors.

It is also an object of the invention to share cache control functions between the L1 and L2 cache memories.

These and other objects of the invention are provided by a method and apparatus for a computer system having a processor with its own on-chip auxiliary memory (e.g. cache memory). The computer system also includes a second auxiliary memory (e.g., cache memory). An interface couples the processor to the second auxiliary memory. The processor controls both the first and the second auxiliary memories to maintain cache coherency. Moreover, in a multiprocessor system designed with multiple processors having dedicated auxiliary memories, the present invention provides a method and apparatus for each processor to maintain its dedicated auxiliary memory.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIGS. 5A–5D illustrate embodiments of an integrated circuit package containing multiple integrated circuit dice according to the present invention.

DETAILED DESCRIPTION OF THE PRESENT INVENTION

A cache memory subsystem for use in a computer system is described in the following detailed description of the present invention numerous specific details are set forth, such as specific numbers of bits, command and signal names, etc., in order to provide a thorough understanding of the present invention. However, it will be understood to one skilled in the art that the present invention may be practiced without these specific details. In other instances, well-known structures and devices are shown in block diagram form, rather than in detail, in order to avoid unnecessarily obscuring the present invention.

The present invention provides for single integrated circuit (IC) die control of multiple IC dice. The multiple dice may be contained within a single integrated circuit package, such that the single die controls the operations of the dice within the package, including its own control. The single die is able to provide control for other dice due to the partitioning of functionality between the dice. The control function of the dice is partitioned, such that the control necessary to monitor and start operations on other dice is placed on a single die, while the control needed to perform a specific function on a die remains. In this manner, a single die is able to know what all of the other dice are doing, while the other dice are performing the function themselves.

The present invention may provide for single die control of a two die integration. In one embodiment, the present invention provides for a second level (L2) cache memory and a processor multi-die arrangement in a computer system.

Figure 1:
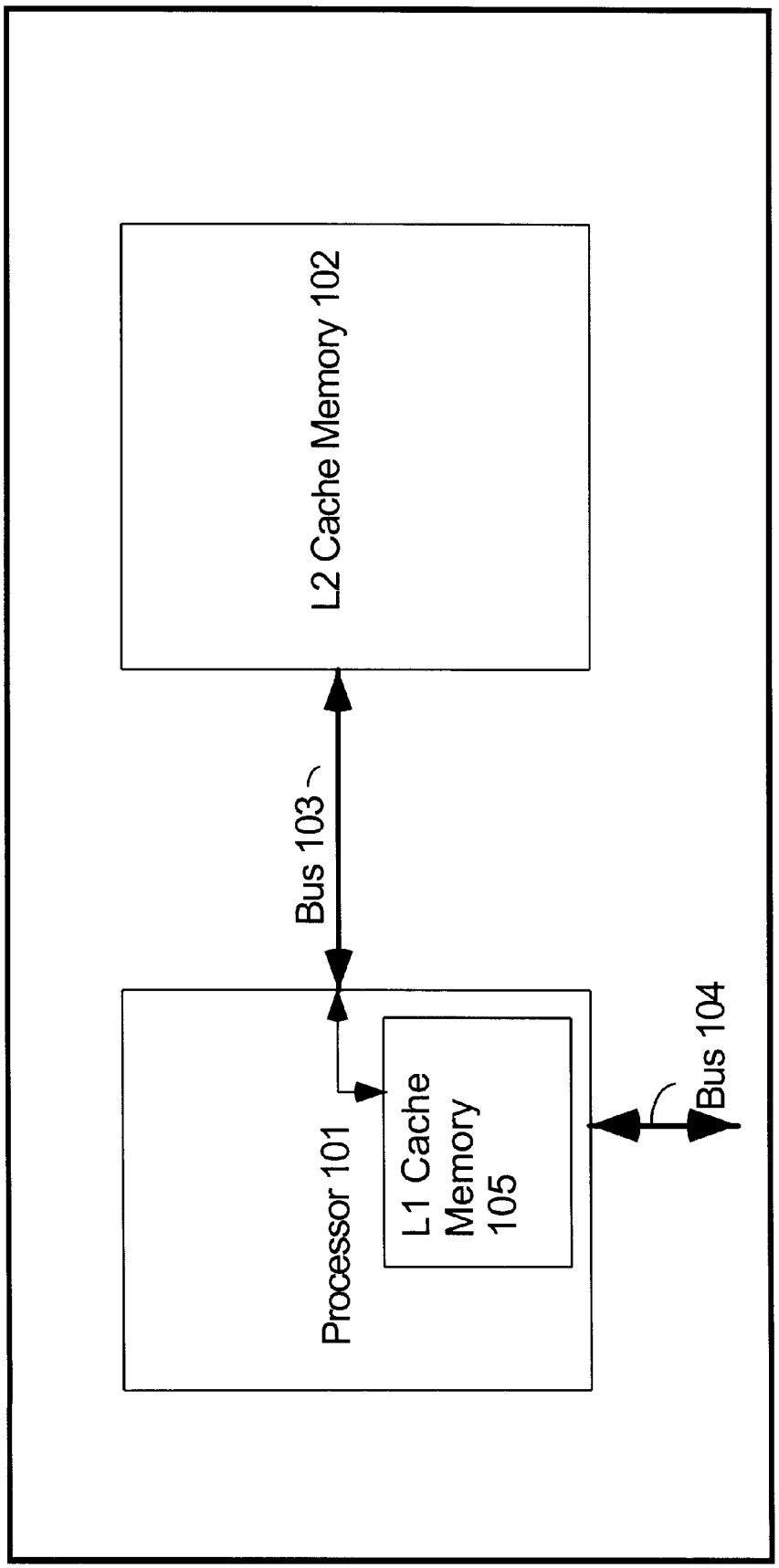
FIG. 1 is a block diagram of one embodiment of the cache memory system of the present invention.

FIG. 1 illustrates the processor and L2 cache memory arrangement of the present invention. Referring to FIG. 1, processor 101 is coupled to the L2 cache memory 102 by bus 103. Bus 103 is referred to as the backside bus. Processor 101 is also coupled to a system bus (not shown) via bus 104. In one embodiment, L2 cache memory 102 may also be coupled to the system bus via its own dedicated bus. Processor 101 and L2 cache memory 102 may be contained in a dual cavity integrated circuit package. Such a package, along with the coupling of processor 101 to cache memory 102, is described later below.

In one embodiment, the processor of the present invention is an Intel Architecture Microprocessor such as manufactured by Intel Corporation of Santa Clara, Calif., the corporate assignee of the present invention. In the present invention, processor 101 may include a level one (L1) cache memory. In the present invention, processor 101 contains the functionality for controlling both the L1 and L2 cache memories.

In one embodiment, L2 cache memory 102 comprises a static random access memory (SRAM) that includes data, a cache directory and cache management logic. The data is stored in a data storage array. The cache directory may include a tag array, tag status and least recently used (LRU) bits. The cache management logic includes the logic to perform tag matching, a replacement algorithm and data routing.

In one embodiment, L2 cache memory 102 is a 4-way set associative cache memory. L2 cache memory 102 is block oriented with a 32-byte line size divided into four 8-byte "chunks". In one embodiment, L2 cache memory 102 stores 512 Kbytes of information. L2 cache memory 102 may be designed to store other amounts of information, such as 256 Kbytes of information.

The L2 cache memory 102 communicates with processor 101 using bus 103. In one embodiment, bus 103 includes an address bus for sending addresses from processor 101 to L2 cache memory 102, a bi-directional data bus, a command bus for sending commands from processor 101 to the L2 cache memory 102 and a bi-directional status and state bus. Bus 103 is internal to the package when processor 101 and cache memory 102 are contained in the same package. In one embodiment, bus 103 is a high frequency (150 MHz), non-multiplexed bus with a 64-bit wide data bus with error correction coding (ECC), a 37-bit address bus, 24 control pins, 12 data integrity pins plus a reset signal and a clock signal. Each 8-byte quantity on the data bus is referred to herein as a "chunk".

In the present invention, L2 cache memory 102 and processor 101 operate at different speeds. In one embodiment, L2 cache memory 102 operates at 66 MHz, while processor 101 operates at 133–150 MHz. In one embodiment, bus 103 provides for communication between L2 cache memory 102 and processor 101 and operates at 150 MHz.

Included along with each L2 data array 32-byte line are 32 data integrity bits. (Eight bits are stored with each set of 64 data bits). The L2 cache memory regards these extra bits as extensions of the data array line, and does not interpret or generate these bits.

One Embodiment of the L2 Cache Memory

Figure 2:
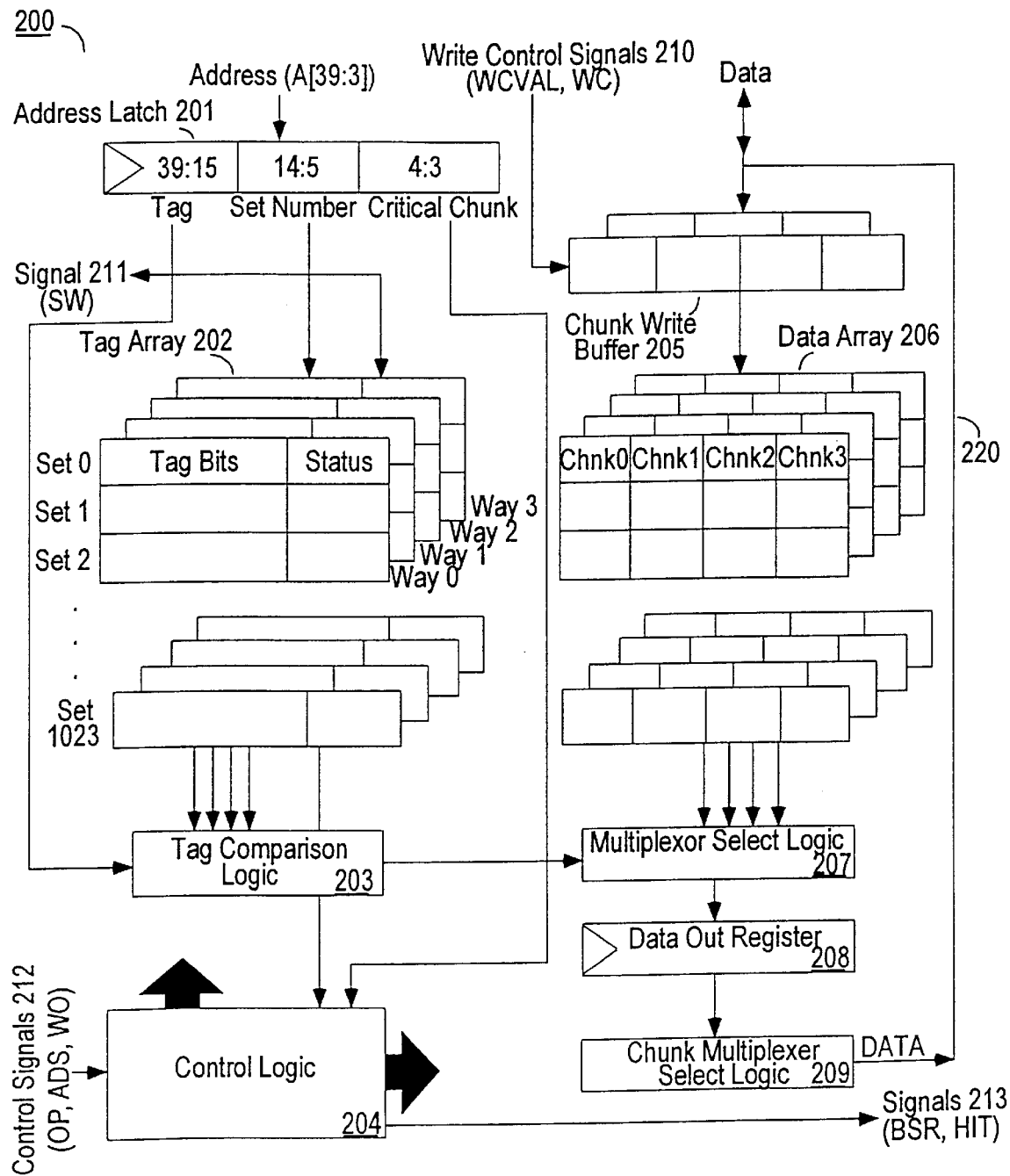
FIG. 2 is a block diagram of the second level (L2) cache memory of the present invention.

A block diagram of one embodiment of the L2 cache memory is shown in FIG. 2. Referring to FIG. 2, L2 cache memory 200 includes address latch 201, tag array 202, tag comparison logic 203, control logic 204, chunk write buffer 205, data array 206, multiplexer (MUX) select 207, data output register 208, and chunk MUX select logic 209. Control logic 204 is coupled to components in L2 cache memory 200 to control their operation, partially in response to control signals 212 received on its inputs and signals by L2 cache memory 200. Control logic 204 also provides signals 213 to the processor.

The address latch 201 receives an address from bus 103. Bits [14:5] of the address select one of the sets in the tag array 202. The contents of the set are compared with bits [39:15] of the address in the comparison logic 203 and the result is used to select the appropriate way in the multiplexer select logic 207. Bits [4:3] of the address select which chunk of the data gets sent to the data bus 220, via the chunk multiplexer logic 209. The status signals from the tag array 202 are also returned to the bus 213 through the control logic 204.

In one embodiment, cache memory 200 is a four-way set associative cache, such that tag array 202 includes four separate ways (shown as way 0–3). In one embodiment, tag array 202 includes 1024 sets, labeled set 0 to set 1023. Each set location in each way includes tag bits and status bits and additional parity bits. Two additional parity bits are included. The size of the tag is dependent on the size of the L2 cache memory. The status bits reflect the state of the L2 cache memory line: Modified, Exclusive, Share, or Invalid (MESI), or Reserved (a state encoded with extra two bits to protect from a state being change due to undesired bit changes in the state encoding). These states are well-known to those skilled in the art.

It should be noted that the L2 cache memory regards the Modified/Exclusive/Shared/Reserved states as valid, and does not distinguish between any of the valid states. In the present invention, the processor distinguishes between the valid states and, thus, implements the cache coherency protocol. That is, the processor of the present invention directly controls the status (MESI) of the stored data lines within the L2 cache memory, and the target associative way information on line writes. Each set of four tags corresponding to the cache lines in all four ways in the tag array contains one least recently used (LRU) field for determining victim line during a read miss. The L2 cache memory implements a pseudo-LRU algorithm for its line replacement policy. In one embodiment, tag array 202 includes an LRU array having an entry for each set in order to replace the least recently used lines in the L2 cache memory. Therefore, each set is associated with one LRU entry, four tag entries and four state entries.

The L2 cache memory supports data integrity through parity. Limited ECC checking is performed on the tag status bits. The data integrity is intended to cover transmission errors on the backside bus and storage errors in tag array 202 and data array 206.

In one embodiment, data array 206 is a 144 Kbyte, 4-way set associative SRAM that is logically organized as a 4×1K× 288. The 288 bit word length is comprised of four 72 bit wide chunks, where each chunk contains 64 data bits plus 8 ECC bits.

The L2 cache memory allows pipelined read accesses for producing a "seamless data" stream along with mechanisms to allow data line read capability and tag array access capability. If a memory request is made to the L2 cache memory, a read operation occurs. During a read operation to the L2 cache memory, an address is driven on the address bus portion of the backside bus. The address represents a portion of the memory request. The address is latched into address latch 201. The set number portion of the address from bits [14:5] in address latch 201 is used to select a set in the four separate ways. The tag bits for the set in each of the ways are sent to tag comparison logic 203 with the tag bit portion of the address from bits [39:15] in address latch 201. Thus, the memory request is compared with the tag entry at the page location in each of the ways to determine if the information is in the cache. In the currently preferred embodiment, since there are four ways, there are four separate comparisons made. These comparisons occur in parallel to determine if the information requested is stored in the cache.

If one of the tags matches the tag from the address, then there is a hit. If the results of the comparison determine there is a hit, the tag comparison logic 203 outputs a signal to MUX select logic 207 causing MUX select logic 207 to select the page and corresponding cache line in data array 206. The cache line data selected is output to the data output register 208 which latches the data for output onto the data bus portion 220 of the backside bus. Using the critical chunk portion of the address from bits [4:3] in address latch 201, the chunk MUX selection logic 209 selects the desired chunk of data for output onto data bus 220, which is output to the processor. In one embodiment, the L2 cache memory transfers a 32-byte cache line in burst fashion in four chunks, with the critical chunk first. On the other hand, if none of the tags from tag array 202 match the tag portion of the address of the memory request, then there is a miss, which is indicated to the processor using one of the signals 213.

When data is being written into the L2 cache memory due to the L1 cache of the processor writing data back to the L2 cache memory or due to information from system memory being input into the processor, a cache line is sent to the L2 cache memory. In one embodiment, the cache line is 32-bytes. The data is received by chunk write buffer 205 from data bus 220. Since data bus 220 is only 8-bytes wide and the cache line in 32-bytes wide, the data is received into the chunk write buffer one chunk at a time. The write control signals 210 cause the data from data bus 220 to be directed to its designated chunk location in chunk write buffer 205. Once chunk write buffer 205 is filled, write control signals 210 cause the data to be transferred from chunk write buffer 205 into data array 206.

Figure 3:
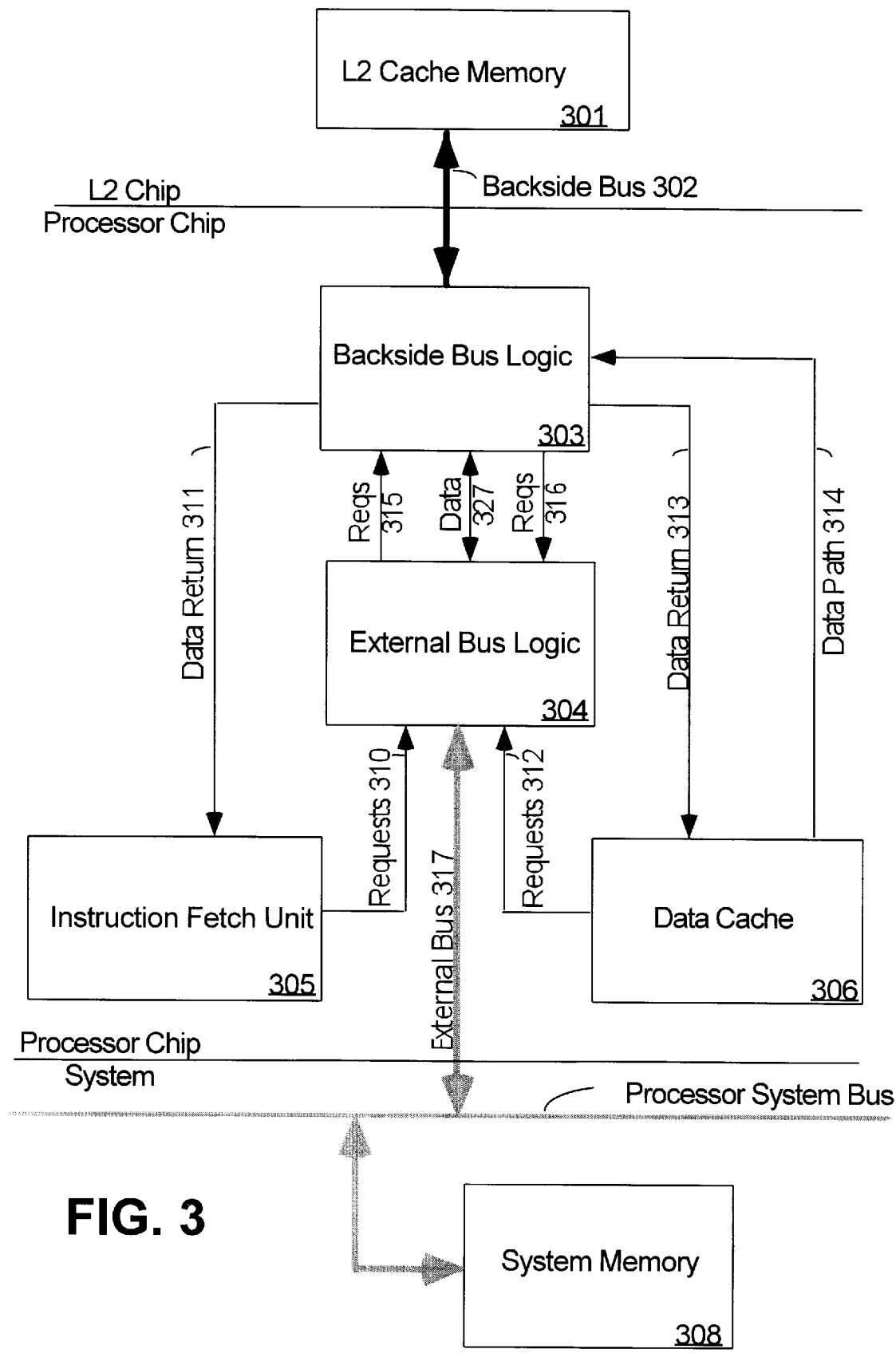
FIG. 3 is a block diagram of one embodiment of the memory subsystem of a computer system implemented according to the present invention.

FIG. 3 is a block diagram of a memory subsystem of the computer system of the present invention. Boundary lines are shown to define the portion of the memory subsystem that is contained within the processor and that portion which is external to the processor. Referring to FIG. 3, an L2 cache memory 301 is coupled to a backside bus 302. Backside bus 302 is also coupled to backside bus logic (BBL) 303. Backside bus logic 303 is also coupled to external bus logic 304, instruction fetch unit (IFU) 305 and the data cache unit (DCU) 306. The external bus logic 304 is also coupled to the instruction fetch unit 305, data cache 306 and the system bus 307. Also shown coupled to system bus 307 is system memory 308.

Instruction fetch unit (IFU) 305 includes instruction fetch logic and the instruction cache and fetches instructions for execution in the processor. When the instruction cache of IFU 305 desires to fetch more instructions, it sends a request on signal 310 to external bus logic 304. The external bus logic 304 sends the request on request lines 315 to backside bus logic 303 which forwards the request to the L2 cache memory 301. In response, the L2 cache memory 301 performs a read operation. If there is a hit in L2 cache memory 301, the instructions are returned to instruction fetch unit 305 on the data return signal path 311 from backside bus logic 303 and backside bus 302.

The IDCU 306 holds temporary copies of data for use by the processor in executing the instructions. In one embodiment, DCU 306 comprises an L1 cache memory. In executing instructions, if the data is not in the DCU 306 (i.e., the L1 cache), a request is made on request signal path 312 to external bus logic 304. External bus logic 304 sends a request on request lines 315 to backside bus logic 303 which forwards the request onto L2 cache memory 301. If the data is in L2 cache memory 301 (if L2 cache memory 301 hits), then the data is forwarded and returned to DCU 306 on data return signal path 313. When data is written back from DCU 306 or if there is no longer room in DCU 306, data is sent out to backside bus 302 via backside bus logic 303 to L2 cache memory 301.

Any time data from L2 cache memory 301 is to be written back to system memory 308, a request is made to external bus logic 304 via request lines 316 from backside bus logic 303. The data is written from the backside bus 302 through backside bus logic 303 to external bus logic 304 via data path 327. External bus logic 304 controls the data by writing the data on external bus 317 to system memory 308 via system bus 307. Any time there is a miss to L2 cache memory 301, external bus logic 304 sends the request to system memory 308 using external bus 317 and system bus 307. The data returned is received by external bus logic 304 and sent to backside bus logic 303 via data path 327 for storage in L2 cache memory 301. The data is then written to DCU 306 via data return lines 313 and to L2 cache memory 301 via backside bus 302.

Processor accesses from the instruction fetch unit 305 are always fetch operations with no intent to modify the data. Similarly read operations from the data cache 306 that are generated by the processor executing a read operation are always data fetch operations. These requests are forwarded to the external bus 317, if they miss the L2 cache memory 301, as read operations from the memory. When the data is returned by the system memory 308, a signal on the external bus 317 indicates if copies of this data also exist in other cache memories in a multiple processor system. If they do, then the data is placed in the L2 cache memory 301 and data cache memory 306 and marked with a state of Shared (S). On the other hand, if no other cache memory has a copy of the data as indicated on the external bus 317 the data can be placed in the L2 cache memory 301 and the data cache memory 306 and marked Exclusive (E).

Whenever the processor intends to modify data, it issues a request to the data cache memory 306 to obtain a copy of the data with complete ownership. If the data is not present in the data cache memory 306, a similar request is sent to the L2 cache memory 301. If the request also misses the L2 cache memory 301, it is then forwarded to the external bus 317 as a data read request with a command modifier indicating to all other processors in the external bus 317 that they must relinquish ownership of this cache line of data and invalidate all copies of the line in their cache memories. The data is then returned to the requesting processor granting it exclusive ownership and is placed in the L2 cache memory 301 and data cache memory 306 in the Exclusive (E) state. The processor is then free to update any portion of the cache line it chooses. This results in a write command being issued to the data cache memory 306 with the modified data and the data cache memory 306 updates its copy of the cache line to reflect the change. It also changes the state of the cache line to Modified (M) and issues a command to the L2 cache memory 301 to do the same. If the processor chooses to modify the data in that cache line yet again, it can do so within the data cache memory 306 without issuing further request to the L2 cache memory 301 and the external bus 317. In the present invention, the processor may be able to control such activity in numerous ways. In one embodiment, the processor may follow a protocol by which the state of a cache line in the data cache memory 306 is always lower than or equal to the state of the same cache line in the L2 cache memory 301, wherein, for example, the hierarchy for a MESI based cache coherency is Modified, Exclusive, Shared, and then Invalid (listed from highest priority to lowest). This is referred to herein as a "dirty" or "modified" inclusion. Implementing such a priority, the processor would be able to determine that if the cache line in the data cache memory 306 is shown to be Modified, then the processor knows that the state of the same cache line in the L2 cache memory 301 was changed to Modified upon the cache in state in the data cache memory 306 and that the L2 cache memory 301 still reflects such a state for the cache line. In another embodiment, if a subsequent change to the same cache line is to occur, the processor could request the state of the cache line as currently indicated by the L2 cache memory 301. Upon seeing that the state is Modified, the processor knows that the data in the data cache memory 306 may be changed. Another mechanism by which the processor is able to identify whether a change in state needs to be made to a cache line in the L2 cache memory 301 upon the occurrence of a subsequent write to the same cache line in the data cache memory 306 is to include a "more modified" indication (e.g., a bit location) for the cache line in the data cache memory 306 that indicates when the data in the data cache memory 306 has been subsequently modified. In such an implementation, when such "more modified" data is to be written back to the external bus (main memory), then the processor is able to determine which data should be written, specifically whether the data in the L2 cache memory 301 suffices or only the data in the data cache memory 306 will do.

Several variations of this scenario can exist regarding modifications to data in the cache memories. For example, the data the processor intends to modify could be in the data cache memory 306 or the L2 cache memory 301, or both, because of a previous data fetch transaction. However, the data is marked Shared (S) indicating that although the cache memory has the latest copy of the data, other cache memories in the system also have copies of it. Under such a circumstance, the data cache memory 306 or the L2 cache memory 301 must make a request on the external bus 317 requesting ownership of the line but not necessarily perform a data fetch operation. This request causes all other cache memories in the system to mark their copies of the cache line as Invalid (I), granting exclusive ownership of the cache line to the requesting processor. This operation needs to be performed in order to ensure that no more than one processor at a time attempts to modify the data in a cache line at a time.

If two processors were to attempt to do so, then the request for ownership for the cache line from one of them will reach the external bus 317 before the other and it will get the opportunity to makes its modifications to the cached data first. The integration of the control for the L2 cache memory 301 into the processor permits considerable optimization of the control logic of these complex operations. Moreover, the interaction between sequential transactions targeted at the same cache line can now be resolved optimally without holding them up and waiting for the entire previous transaction to complete. To this and, multiple operations may be merged into single transactions by the processor. This has a dramatic effect upon the performance of multiple processor systems that are sharing the same data out of the system memory 308.

By integrating the control for the L2 cache memory 301 into the processor, the present invention is able to better coordinate the activities and transactions that occur in the computer system. The single control of the processor is functionally positioned with respect to the data cache memory 306, the L2 cache memory 301 and the external bus to allow the controller to obtain information and respond, if necessary, to any transaction on the three ports (data cache memory 306, the L2 cache memory 301 and the external bus) that is currently in progress. The controller of the present invention can merge transactions sourced from one or more of the data cache memory 306, the L2 cache memory 301 and the external bus into a single transaction directed to the processor core or a port.

For example, if the processor core desires to modify a cache line in the data cache memory 306 which is marked as Exclusive (E) in the data cache memory 306 and the L2 cache memory 301, when the data is modified in the data cache memory 306, the L2 cache memory 301 must be set to Modified (M) (if following the protocol discussed above). Then, if there is no Modified state written into the L2 cache memory 301, a later modification to different data in the same cache line occurs, and the cache line is to be evicted from the data cache memory 306, then the state must be changed to Modified (M) in the L2 cache memory 301 and the L2 cache memory 301 must be updated with the modified data. The controller of the present invention is able to merge the operations into a single operation. In a similar fashion, the controller of the present invention is able to recognize conflicts between transactions with the processor core and the L2 cache memory 301 and merge the transactions, such that multiple transactions, as a whole, are optimized into lesser operations, when possible.

Controlling the L2 Cache Memory

The processor of the present invention controls the functionality of the L2 cache memory, such that the L2 cache memory is a slave on the backside bus. That is, the control of the L2 cache memory is partitioned between the processor and the L2 cache memory in such a way that the processor of the present invention controls and knows what the L2 cache memory is doing (e.g., whether the L2 cache memory is transferring data). In one embodiment, the processor uses the same control logic to control both the L1 and the L2 caches. By using the same control logic, cost and complexity of the system is reduced and better overall performance is obtained. In the present invention, processor 101 controls the L2 cache memory using opcodes sent by the processor to the L2 cache memory.

The processor controls the L2 cache memory behavior through micro-operations which provide the functionality needed for all processor micro-operations requiring the L2 cache memory. In one embodiment, these micro-operations are used to perform all write operations to the L2 cache memory. Also, the processor uses these micro-operations to maintain the cache consistency. These micro-operations function within the confines of the interface provided between the processor and the L2 cache memory in order to implement single die control in a multi-die package. A brief description of each micro-operation performed by the L2 cache memory is given below.

L2 Read Inquire: The processor uses this micro-operation to read an entire line from L2 cache memory if the line is resident in the L2 cache memory. The processor sends a complete address to the L2 cache memory. The L2 cache memory examines the specified set number to see if it has the specified tag. The L2 cache memory signals a hit to the processor if a tag match is found and the status of the line is modified, exclusive, shared, or reserved. On a hit, the L2 cache memory updates the appropriate LRU field and returns the way information, the value of the status, and the data line in a burst fashion over four cycles to the processor. If the tag did not match, the L2 cache memory returns the way information, status and full line address (tag and set) of the cache line to be replaced. If a miss occurred, the LRU field is not updated, but will be updated when the replacement line is written using the Write Line Update micro-operation.

State Write: The processor may change the status of any given line in the L2 cache memory with this micro-operation. The processor indicates the set address, the way, and the status value to be stored. No tag matching is done on the address and the L2 cache memory LRU field is not modified.

State Read: The processor reads the status of any given line in the L2 cache memory with this micro-operation. The processor indicates the set address and the way to be read. The L2 cache memory returns the status of the specified line. No tag matching is done on the address and the L2 cache memory LRU field is not modified. This operation may be used for testing purposes.

Tag Inquire: This operation prompts the L2 cache memory to determine if it contains a given line. The L2 cache memory examines the specified set number to determine if it has the specified tag. The L2 cache memory then signals a hit to the processor if a tag match is found and the status of the line is something other than invalid (an illegal status encoding will all signal a hit, but will also cause an SERR). The L2 cache memory data array is not accessed and the L2 cache memory LRU field is not modified. This operation may be used in response to a request from a device on the external bus made to determine if data that is desired is currently stored in the cache memory.

Tag Inquire Up date: This micro-operation is identical to Tag Inquire, except that the LRU field is updated upon a match.

Tag Array Read: This micro-operation is used to read an entry in the tag array without accessing the data array. The processor provides the set address and the way information. The L2 cache memory returns the tag status and the full address. The address is returned over the data lines using the natural alignment of the tag. This scheme avoids bi-directionality on the address lines. The L2 cache memory LRU field is not modified.

Data Array Read: This micro-operation is used to read an entry in the data array without accessing the tag array. The processor provides the set address and the way information. The data line is sent back in a burst fashion over a four cycle burst. The L2 cache memory LRU field is not modified. This operation may be used to test the array.

Write Chunk: The processor uses this micro-operation to load a data chunk into the Chunk Write Buffer on the L2 cache memory chip by specifying the chunk number, driving a data word onto the data bus, and signaling the L2 cache memory to write the chunk. This micro-operation can occur independently of any other L2 cache memory operation not involving the data bus. It is the responsibility of the processor to prevent data bus collisions when issuing Write Chunk micro-operations. No data array or tag array accesses are made during this operation and the LRU field is not modified. This operation is used to write data onto the L2 cache memory and is used to write each chunk to the l1 cache memory.

Write Line: This micro-operation is used as the final step in writing an entire line into the L2 cache memory. The line to be written is first stored in the L2 cache memory Chunk Write Buffer using the Write chunk micro-operation described above. The processor then uses the Write Line micro-operation along with specifying the tag and set address, the way information, and the status of the line to be written. The entire line contained in the Chunk Write Buffer is then written into the L2 cache memory data array. The tag and the status are written into the tag array and status array, respectively. The Write Line micro-operation may be issued concurrently with the last of the four Write Chunk commands. The LRU field is not modified with this micro-operation.

Write Line Update: This micro-operation is identical to the Write Line with the addition that the LRU field is updated.

The processor sends these micro-operations to the control logic of the L2 cache memory which decodes the micro-operations to control the sequence of outputs and to provide data integrity. The decoding performed produces signals that initiate access cycles. The control block of the L2 cache memory also performs output control. The control logic also includes logic for performing data integrity operations.

The micro-operations operate on the L2 cache memory using the interface provided by the backside bus. One embodiment of the backside bus provides the following L2 cache memory external interface:

| NAME | CLASS | I/O | DESCRIPTION |
|---|---|---|---|
| A[39:3] | Processor Addr | Input | Physical Address presented by the processor to the L2 cache memory. The Address field is only valid when ADS is asserted. For several of the L2 cache memory operations, only subfields of the address field are examined. |
| D[63:0] | Processor Data | IOput | Data is transfered to and from the L2 cache memory over this bidirectional bus. A dead clock is needed to prevent bus contention during direction switching. During certain operations, this bus can contain an address field or control register data, driven by the L2 cache memory. |
| ADS | Processor Cntl | Input | Upon assertion, the AdDress Strobe indicates to the L2 cache memory that a valid microoperation i being requested by the processor. |
| CLK | Processor Cntl | Input | Full frequency Clock sent to the L2 cache memory from the processor. |
| OP[3:0] | Processor Cntl | Input | The L2 cache memory OPeration is encoded in this field. OP is used y L2 cache memory only when ADS is asserted. |
| SW | Processor Cntl | Input | The Status Write bits are supplied by the processor on a status update operation. The processor controls the MESI status bits of each tag in the directory array |
| RESET | Processor Cntl | Input | Buffered System RESET pin. |
| WC[1:0] | Processor Cntl | Input | The Write Chunk field encodes into which write chunk buffer should the chunk data should be latched. It is used by the L2 cache memory only when WCVAL is asserted, and is otherwise undefined. |
| WCVAL | Processor Cntl | Input | The Write Chunk VALid indicates to the L2 cache memory that a data chunk is to be stored in its data line buffer register. The chunk number is specified by WC. |
| WO[1:0] | Processor Cntl | Input | The 2-bit Way Out field is an extension of the address field in that it specifies which way is being referenced by the processor in the given operation. |
| HIT | Processor Cntl | Output | HIT. Indicates status information on a line read or tag inquire. |
| WR[1:0] | Processor Cntl | Output | The Way Read field provides the processor the way number of the line that is referenced by the current micro-operation. |
| SR[3:0] | Processor Cntl | Output | The Status Read bits of a given line in the L2 cache memory is driven by the L2 cache memory. |
| AP[1:0] | Processor Integrity | Input | Two bits of Address Parity protect each entry in the L2 cache memory tag array. The address is examined for parity correctness on transmission from processor to L2 cache memory. The transmitted parity bits are stored in the tag array. The address parity is interleaved over the field, with AP[1] protecting the odd bits of A, and AP[0]protecting the even bits of A. Parity is odd. |
| DECC[7:0] | Processor Integrity | Input | The Data Error Checking and Correcting bits are supplied with each data transfer, regardless of direction, and have the same timing as the D bits. These pins are driven with as a 1 when the L2 cache memory is driving an address or control register data back to the processor. |
| OUTP | Processor Integrity | Input | OUTput Parity, sent to the L2 cache memory from the processor, calculated over Way Out, |

| NAME | CLASS | I/O | DESCRIPTION |
|---|---|---|---|
| | | | and Opcode field. |
| WCPAR | Processor Integrity | Input | Write Chunk PARity, sent to L2 cache memory from the processor, calculated over the chunk number specified by WC. |
| SERR | Processor Integrity | Output | The L2 cache memory detected a Storage Error in the tag or status array, and asserts this signal to the processor. |
| TERR | Processor Integrity | Output | If a transmission error from the processor to the L2 cache memory is detected, the TERR signal is asserted to indicate Transmission Error. |
| INP | Processor Integrity | Output | INput Parity, sent to the processor from the L2 cache memory, computed over the Hit/Miss, Way Read, and Storage/Transmission Error signals. |

Through the use of the above signals, the present invention allows access to the L2 cache memory by the processor. However, the L2 cache memory is able to complete the access in any manner. The processor does not need to know how the access is being completed. Because of this partitioning, any L2 cache memory may be designed for use in the computer system of the present invention. Other signals for bond control and testing, as well as for testing the processor, have been omitted to avoid obscuring the present invention.

Note that the processor die includes the control logic for generating the micro-operations and using the interface provided between the L2 cache memory die and the processor die, the processor provides a unilateral control path between the two dice, with only the bi-directional data bus as an exception. In this manner, the partitioning between the two dice allows one of the dice to include the necessary functionality to control the other die(s).

The sequence of operations that are sent to the L2 cache are controlled by the processor. This control logic can make optimal use of the L2 cache memory as it has access to the L1 cache memory, the processor requests and the system bus requests. The logic is designed to provide the highest priority to all processor accesses. These accesses use the address bus and the arrays for a short period of time but then use the data bus to read out the data chunks over four cycles. The control logic can recognize this condition and perform tag inquire instructions to operate in parallel and not require the data bus.

In the present invention, the processor performs an L1 cache memory look-up before sending a memory request out to the L2 cache memory. In another embodiment, the L1 and L2 cache memory look-ups are sent at the same time. In this case, the information may be obtained one or two cycles earlier than the prior art.

By having a single point of control in the processor, the complexity of the memory subsystem is reduced by having to use only a simple interface between the processor and the L2 cache memory. This interface only includes an address bus, a data bus and some status signals sent from the processor to the L2 cache memory for providing information to the L2 cache memory in one direction. Only the data bus is bi-directional.

Due to the partitioning in the present invention, multiple types of cache memory organizations may be utilized with the processor of the present invention. The cache memory must only be able to satisfy the memory request from the processor according to its organization. This allows the L2 cache memory to be upgraded to a different organization in the future without impacting the particular site in the circuit board. The only requirement is that the signals from the IC package remain the same. In the present invention, the directory and data of the L2 cache memory operate independently. Because of this, it can be upgraded independently. It is possible for the data to be transferring data over on the data bus while the control is receiving a command to look up the directory to perform a tag match.

In order to accommodate multiple requests in a single cycle, a duplicate of the directory could be utilized. In this case, the processor can examine the directory as well as another item on the bus. In another embodiment, a handshake signal may be used to indicate that the cache memory is not ready, and at a proper time, a signal could be used to indicate that the cache memory is ready. Although these alternatives are possible, the present invention is directed mainly to simplify the interface between the processor and the cache memory.

By interleaving a data transfer cycle with a directory look-up, the data transfer and the look-up can be totally hidden under the command of the data transfer such that it can be done inexpensively.

Also, because the processor handles all L2 cache memory look-ups, a miss to the L2 cache memory does not stall accesses on the system bus. If the processor sends memory requests for addresses A, B and C to the L2 cache memory, a miss address A in the prior art would tie up the bus even though data corresponding to addresses B and C are in the L2 cache memory. In this case, if data of address A is not in cache, the data at addresses B and C in the cache could not be obtained until the memory request to address A was satisfied. In the present invention, because the processor contains all the control logic, when a miss occurs, the processor can immediately send the request out on the system bus while continuing to send requests to the L2 cache memory for data corresponding to addresses B and C. As far as the L2 cache memory is aware, the memory request (i.e., read operation) has finished therein resulting in a miss.

Figure 4:
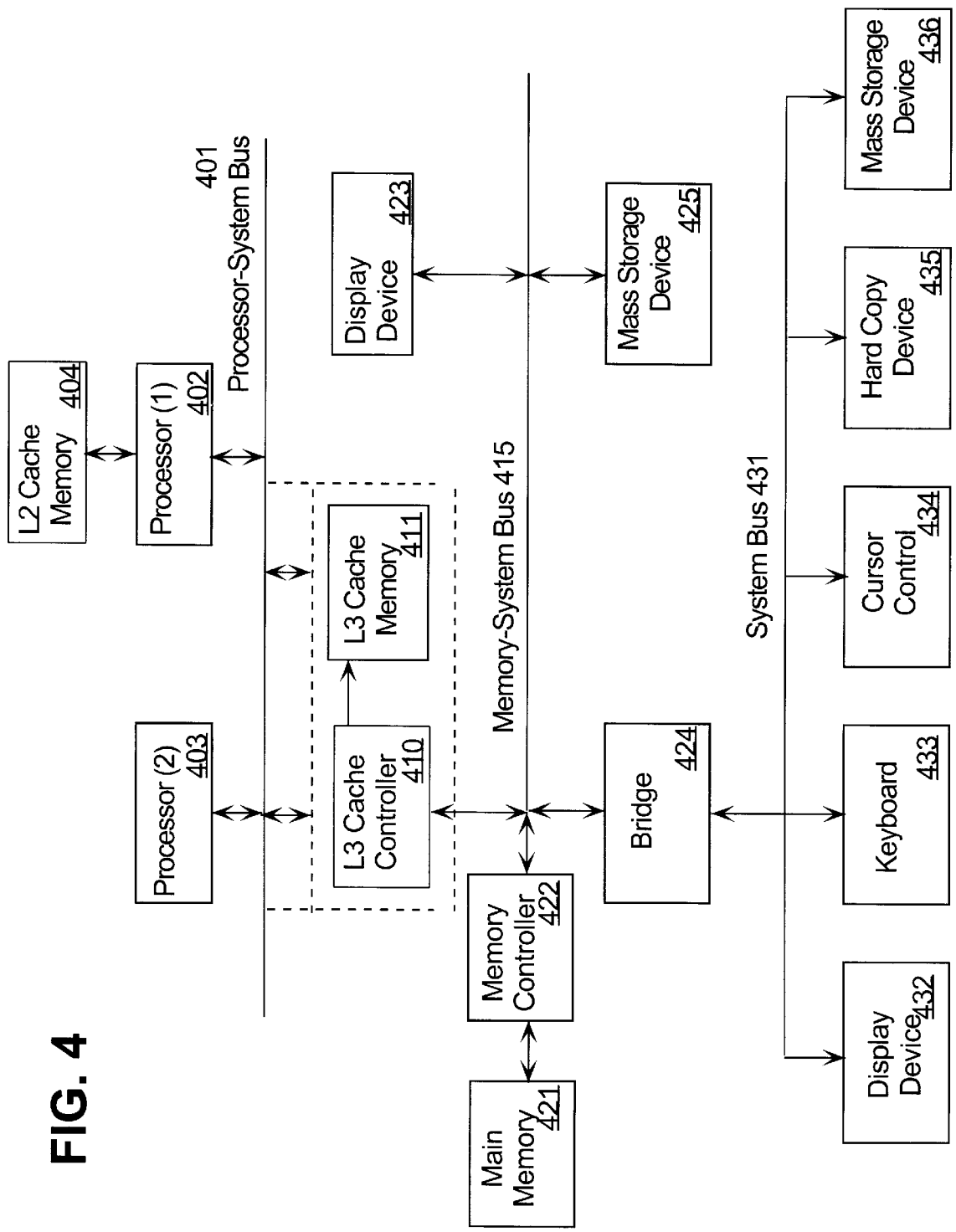
FIG. 4 is a diagram of one embodiment of the computer system of the present invention.

The processor and the L2 cache memory in the present invention may be integrated in a computer system such as that in FIG. 4. Referring first to FIG. 4, an overview of a computer system of the present invention is shown in block diagram form. It will be understood that while FIG. 4 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment.

As illustrated in FIG. 4, a computer system, as may be utilized by the preferred embodiment of the present invention, generally comprises a processor-system bus or other communication means 401 for communicating information and a processor 402 coupled with processor-system bus 401 for processing information. In the present invention, processor-system bus 401 includes address, data and control buses. In the currently preferred embodiment, processor 402 includes an internal cache memory, commonly referred to as a level one (L1) cache memory for temporarily storing data and instructions on-chip. A level two (L2) cache memory 404 is coupled to processor 402 for temporarily storing data and instructions for use by processor 402. In the currently preferred embodiment, cache memory 404 is included in the same chip package as processor 402.

Also coupled to processor-system bus 401 is processor 403 for processing information in conjunction with processor 402. Processor 403 may comprise a parallel processor, such as a processor similar to or the same as processor 402, or may comprise a co-processor, such as a digital signal processor. A level three (L3) cache memory 411 for temporarily storing data and instructions for use by other devices in the computer system (e.g., processor 402, processor 403, etc.) and a L3 cache controller 410 for controlling access to L3 cache memory 411 may also be coupled to processor-system bus 401. The L3 cache controller 410 is also coupled to memory-system bus 415.

A memory-system bus or other communication means 415 for communicating information is coupled to processor 402 for providing processor 402 and other devices in the computer system access to the memory and input/output (I/O) subsystems. A memory controller 422 is coupled with memory-system bus 415 for controlling access to a random access memory (RAM) or other dynamic storage device 421 (commonly referred to as a main memory) for storing information and instructions for processor 402 (and processor 403). A mass data storage device 425, such as a magnetic disk and disk drive, for storing information and instructions, and a display device 423, such as a cathode ray tube (CRT), liquid crystal display (LCD), etc., for displaying information to the computer user are coupled to memory-system bus 415.

An input/output (I/O) bridge 424 is coupled to memory-system bus 415 and I/O bus 431 to provide a communication path or gateway for devices on either memory-system bus 415 or I/O bus 431 to access or transfer data between devices on the other bus. Specifically, bridge 424 turns the byte/word/dword data transfer traffic from I/O bus 431 into line size traffic on memory-system bus 415.

I/O bus 431 communicates information between devices in the computer system. Devices that may be coupled to system bus 431 include a display device 432, such as a cathode ray tube, liquid crystal display, etc., an alphanumeric input device 433 including alphanumeric and other keys, etc., for communicating information and command selections to other devices in the computer system (e.g., processor 402) and a cursor control device 434 for controlling cursor movement. Moreover, a hard copy device 435, such as a plotter or printer, for providing a visual representation of the computer images and a mass storage device 436, such as a magnetic disk and disk drive, for storing information and instructions may also be coupled to system bus 431.

Of course, certain implementations and uses of the present invention may not require nor include all of the above components. For example, in certain implementations, the L3 cache controller and L3 cache memory may not be required. In such implementations processors (402) and (403) will reside directly on a memory system bus 415. In other implementations, it may not be required to provide a display device for displaying information. Certain implementations of the present invention may include other components.

Figure 5A:
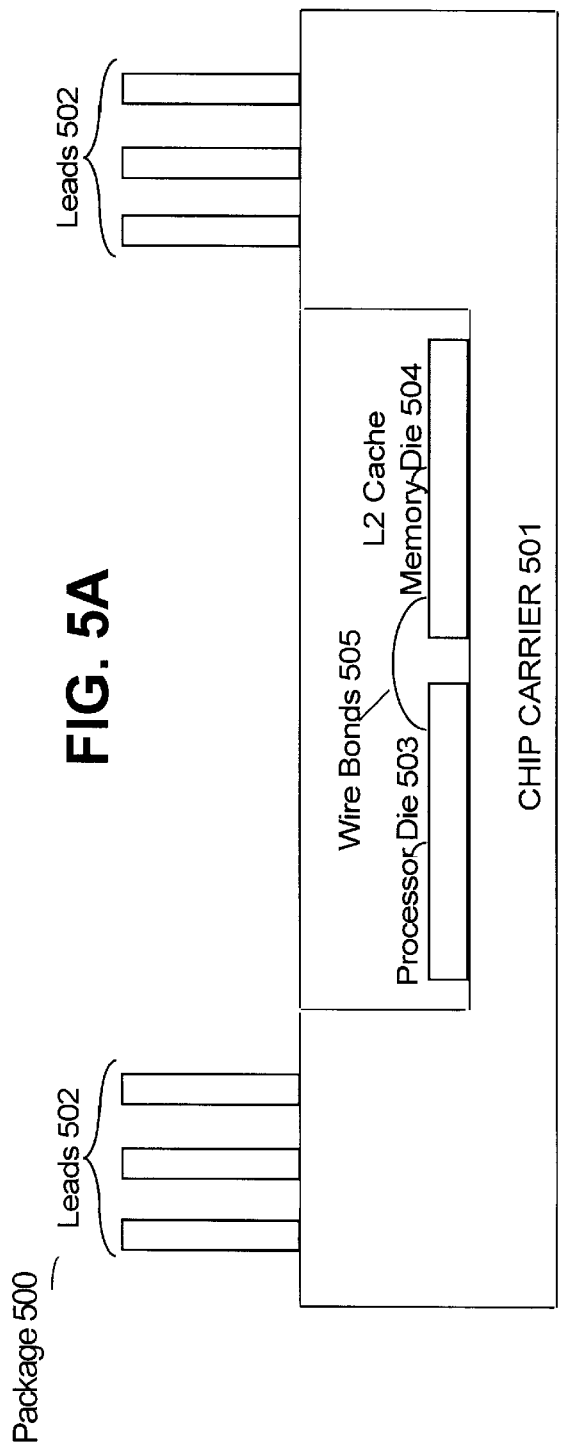

In one embodiment, the L2 cache memory and the processor of the present invention are contained within the same integrated circuit package. FIG. 5A illustrates a section view of one embodiment of the dual die package of the present invention. Referring to FIG. 5A, package 500 includes chip carrier 501 for encapsulating and protecting multiple integrated circuit (IC) dice, leads or pins 502 for electrically coupling dice in package 500 to the circuit board (not shown), wirebond 505, processor die 503 and L2 cache memory die 504. The coupling between the circuit board and package 500 has not been shown to avoid obscuring the present invention. Die 503 is also coupled to leads 502, such that electrical signals may be transferred from die 503 (and die 504) to off-chip (i.e., to the printed wiring board). In one embodiment, die 503 is wire bonded to leads 502 of package 500 in a manner well-known to those skilled in the art. Although only six leads are shown, the actual number of leads for the package is generally much larger, numbering in the hundreds.

The leads 502 and the chip carrier 501 are comprised of materials standard in the art. For instance, leads 502 may comprise copper leads. Similarly, chip carrier 501 may be a ceramic carrier, a plastic carrier or other material suitable for encasing the multiple dice of package 500.

In one embodiment, processor die 503 and L2 cache memory die 504 are integrated circuits fabricated using well-known metal-oxide semiconductor (MOS) techniques. Although only die 503 and die 504 are shown, other embodiments may include more than two dice integrated into the same package. Processor die 503 and cache memory die 504 are electrically coupled to each other by wirebond 509. Moreover, die 503 and die 504 are coupled to chip carrier 501 using, for example, adhesive, such a epoxy.

Figure 5B:
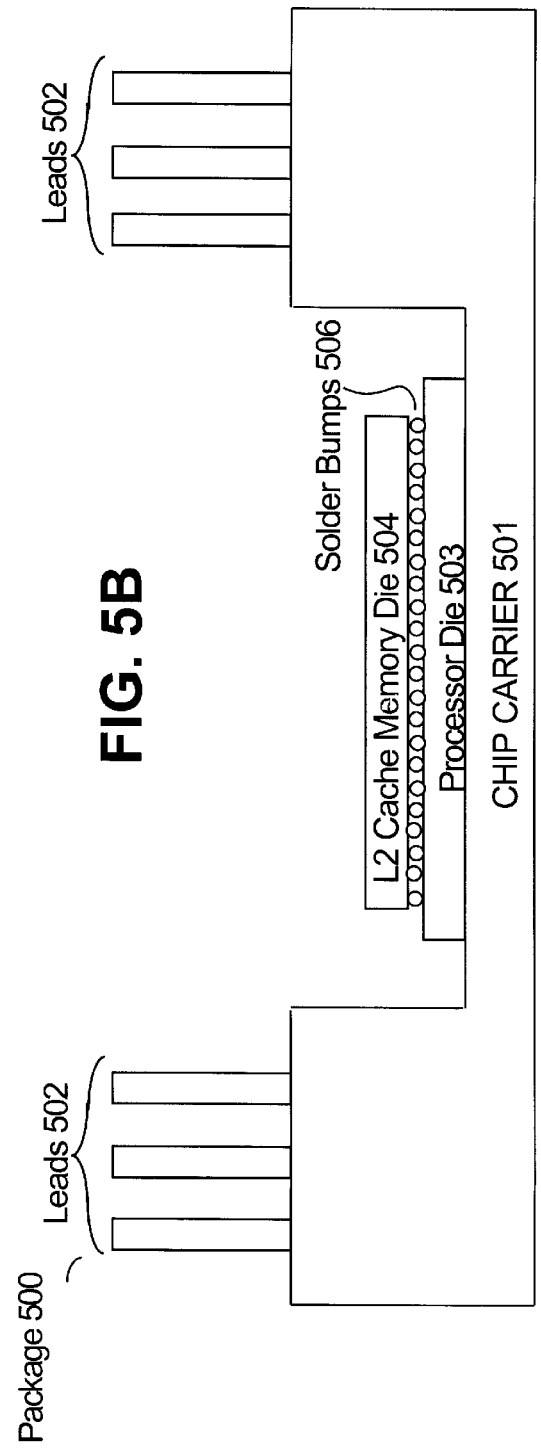

Die 503 and die 504 may be electrically coupled to each other in numerous other ways. In one embodiment, L2 cache memory die 504 is coupled directly on top of die 503 using solder bumps (e.g., solder bumps 506) in a flip-chip type configuration, such as shown in FIG. 5B. Processor die 503 and L2 cache memory die 504 may be coupled to a trace 507 using wirebonds 509, such as shown in FIG. 5C. In this case, trace 507 acts as part of the electrical connection between the dice. In yet another embodiment, die 503 and die 504 may be solder bumped to a common silicon substrate 511 using solder bumps 506 as shown in FIG. 5D. In this case, silicon substrate 511 provides a communication path between the dice.

The present invention provides for a more reliable connection because the distance the signals travel between the two dice is reduced. This distance is substantially shorter than the distance of traveling over the printed wiring board and the pins. Moreover, the fact that both dice are contained in one package prevents signals from having to cross the packaging material (e.g., the ceramic) travel through the printed circuit board and then continue into another chip. Therefore, the present invention provides excellent electrical characteristics for high frequencies.

The present invention also reduces the total number of pins required for the microprocessor and the cache memory. In the prior art, a certain number of pins are used to transfer information between the cache memory and the microprocessor. This transfer occurs over the printed wiring board. However, because the cache memory is contained in the same package, the pins used to transfer data between the cache memory and the microprocessor are eliminated. Thus, the overall number of pins is reduced.

The present invention allows multiple dice developed using different technologies to be integrated into the same package. Each of the dice may be developed and optimized independently. In other words, a processor may be designed and manufactured based on technology that optimizes the processor while a cache memory may be designed and manufactured based on technology optimized for the cache memory (e.g., SRAM technology). Therefore, even though the two have different design complexities both may be integrated into the same package.

The present invention also provides a single chip replacement upgrade capability when a new processor and cache memory pair is to be placed in the system. In this case, all that is required to obtain an upgrade is the extraction of one chip from the printed wiring board. Moreover, the cache memory can be upgraded independently because of the partitioning. Normally, the printed wiring board is designed to include a cache memory having a predetermined number of pins and particular electrical characteristics. Therefore, to change the cache memory requires a change in the printed wiring board. Thus, using the present invention, the cache memory may be upgraded without having to upgrade the entire printed wiring board.

Furthermore, the present invention provides reduced electromagnetic interference (EMI). The package, in effect, shields radiation between the two dice due to the shorter connection. Thus, the physical proximity of the two multiple dice together provides for a much more uniform terminal environment. This environment can also reduce the effects of drifts because of the characteristic process variations due to temperature are lowered because both dice are at approximately the same temperature.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, an L2 cache memory subsystem has been described.

We claim:

1. A computer system comprising:
   a first die comprising a processor and a first auxiliary memory;
   a second die comprising a second auxiliary memory; and
   an interface coupled between the processor and the second auxiliary memory to transfer information between the processor and the second auxiliary memory;
   wherein the processor controls accesses to the second auxiliary memory by issuing one or more micro-operations that are decoded by the second auxiliary memory, further wherein the processor maintains cache coherency between the first auxiliary memory and the second auxiliary memory with at least one of the micro-operations transferred to the second auxiliary memory via the interface to cause the second auxiliary memory to maintain coherency with the first auxiliary memory.

2. The computer system defined in claim 1 wherein the interface is a dedicated interface between the processor and the second auxiliary memory.

3. The computer system defined in claim 1 wherein the processor and the second auxiliary memory are contained in the same integrated circuit package.

4. The computer system defined in claim 1 wherein the first auxiliary memory comprises a first level cache memory and the second auxiliary memory die comprises a second level cache memory.

5. The computer system defined in claim 1 wherein a first portion of the interface transfers at least one opcode to the second auxiliary memory indicate a change in state for a portion of data stored in the second auxiliary memory.

6. The computer system defined in claim 5 wherein a second portion of the dedicated interface transfers status bits supplied by the processor to the second auxiliary memory indicating the state for the portion of data stored in the second auxiliary memory.

7. An integrated circuit package comprising:
   a processor die having a first auxiliary memory;
   a second auxiliary memory die;
   an interface coupled between the processor die and the second auxiliary memory die to transfer information between the processor and the second auxiliary memory;
   wherein the processor die controls accesses to the second auxiliary memory die by issuing micro-operations that are decoded by the second auxiliary memory, wherein the processor maintains cache coherency between the first auxiliary memory and the second auxiliary memory by issuing one or more micro-operations to the second auxiliary memory, wherein a first portion of the interface transfers at least one opcode to indicate a change in state for a portion of data stored in the second auxiliary memory, the opcode being transferred to the second auxiliary memory.

8. The integrated circuit package defined in claim 7 wherein the first auxiliary memory comprises a first level cache memory and the second auxiliary memory die comprises a second level cache memory.

9. The integrated circuit package defined in claim 7 wherein a second portion of the dedicated interface transfers status bits supplied by the processor to the second auxiliary memory indicating the state for the portion of data stored in the second auxiliary memory.

10. A multiprocessor computer system comprising:
    a bus;
    a main memory coupled to the bus;
    a first processor die having a first processor and a first auxiliary memory, the first processor die coupled to the bus;
    an auxiliary memory die having a second auxiliary memory coupled to the bus;
    a second processor die having a second processor coupled to the bus;
    a digital signal processor coupled to the bus, the digital signal processor capable of operating on data stored in the main memory;
    wherein the first processor controls accesses to the second auxiliary memory by issuing one or more micro-operations that are decoded by the second auxiliary memory, further wherein the first processor maintains cache coherency between the first auxiliary memory and the second auxiliary memory with at least one of the micro-operations transferred to the second auxiliary memory to cause the second auxiliary memory to maintain coherency with the first auxiliary memory.

11. The multiprocessor computer system of claim 10 further comprising an interface between the first processor and the second auxiliary memory to transfer information between the processor and the second auxiliary memory, wherein a first portion of the interface transfers at least one opcode to the second auxiliary memory to indicate a change in state for a portion of data stored in the second auxiliary memory.

12. The multiprocessor computer system of claim 11 wherein a second portion of the interface transfers status bits supplied by the first processor to the second auxiliary memory indicating the state for the portion of data stored in the second auxiliary memory.

13. The multiprocessor computer system of claim 10 wherein the first auxiliary memory comprises a first level cache memory and the second auxiliary memory comprises a second level cache memory.

* * * * *